United States Patent
Ichiryu (10) Patent No.: US 11,173,750 B2
(45) Date of Patent: Nov. 16, 2021

(54) PNEUMATIC RADIAL TYRE

(71) Applicant: Sumitomo Rubber Industries, Ltd., Kobe (JP)

(72) Inventor: Yutaka Ichiryu, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 190 days.

(21) Appl. No.: 16/690,665

(22) Filed: Nov. 21, 2019

(65) Prior Publication Data

US 2020/0189324 A1 Jun. 18, 2020

(30) Foreign Application Priority Data

Dec. 13, 2018 (JP) .............................. JP2018-233473

(51) Int. Cl.
*B60C 11/13* (2006.01)

(52) U.S. Cl.
CPC .......... *B60C 11/13* (2013.01); *B60C 2200/10* (2013.01)

(58) Field of Classification Search
CPC .......................... B60C 11/13; B60C 2200/10
See application file for complete search history.

(56) References Cited

U.S. PATENT DOCUMENTS

| | | | | |
|---|---|---|---|---|
| 4,240,484 A | * | 12/1980 | Kojima | B60C 11/0306 |
| | | | | 152/209.11 |
| 4,802,520 A | * | 2/1989 | Armellin | B60C 3/04 |
| | | | | 152/454 |
| 7,954,527 B2 | * | 6/2011 | Ohara | B60C 11/1369 |
| | | | | 152/209.17 |
| 2005/0098250 A1 | * | 5/2005 | Ito | B60C 11/0302 |
| | | | | 152/209.11 |
| 2018/0194171 A1 | | 7/2018 | Suzuki | |

FOREIGN PATENT DOCUMENTS

| | | |
|---|---|---|
| EP | 2204294 A1 | 7/2010 |
| JP | 7-81317 A | 3/1995 |

OTHER PUBLICATIONS

Extended European Search Report for European Application No. 19208837.5, dated May 4, 2020.

* cited by examiner

*Primary Examiner* — Matthew J Daniels
*Assistant Examiner* — Shibin Liang
(74) *Attorney, Agent, or Firm* — Birch, Stewart, Kolasch & Birch, LLP (57) ABSTRACT

A pneumatic radial tyre includes a plurality of shoulder lateral grooves crossing shoulder lard regions. In a cross-sectional view of at least one of the shoulder lateral grooves taken along a groove width center line thereof, a groove bottom of the shoulder lateral groove includes a first bottom surface portion arranged on an inner side in a tyre axial direction and a second bottom surface portion extending between the first bottom surface portion and the tread surface outer end in a concave arc shape having a radius of curvature.

20 Claims, 7 Drawing Sheets

PNEUMATIC RADIAL TYRE

TECHNICAL FIELD

The present invention is specifically suitable for a tyre for a motorcycle, and relates to a pneumatic radial tyre having suppressed generation of cracks at groove bottoms of shoulder lateral grooves.

BACKGROUND ART

Figure 2:
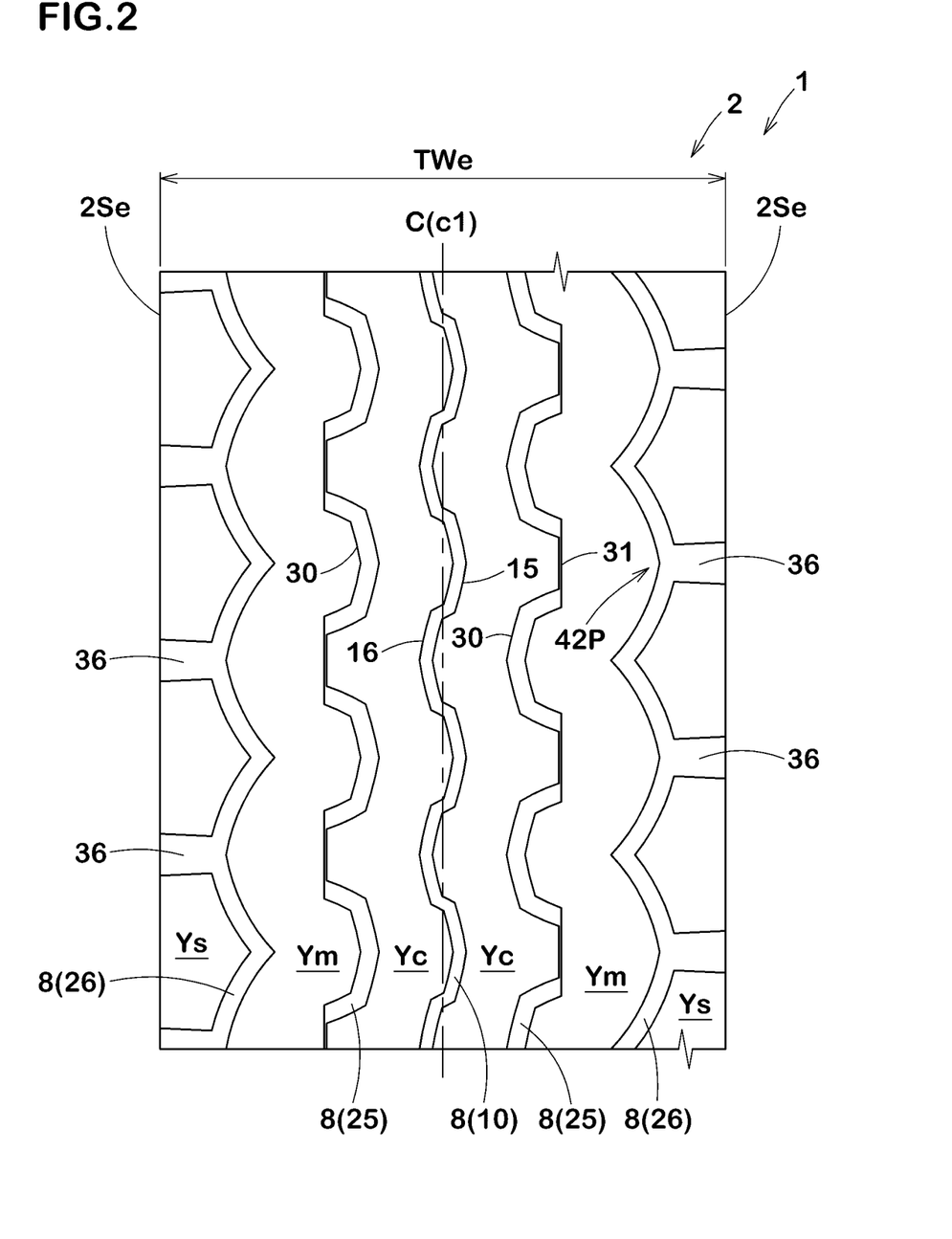
FIG. 2 is a development: view of a tread portion.

Conventionally, there has been known a pneumatic tyre in which a shoulder land region defined between a shoulder main groove and an outer end of a tread surface is divided into a plurality of blocks by providing the shoulder land region with a plurality of shoulder lateral grooves (see FIG. 2 of Japanese Unexamined Patent Application Publication No. H07-81317, for example).

The shoulder lateral grooves configured as such each cross the shoulder land region, therefore, drainage property is improved and they are helpful for improving wet performance.

However, in the case of a radial tyre, carcass cords are arranged in a tyre axial direction, therefore, deformation is likely to occur at the groove bottoms of the shoulder lateral grooves when they contact with the ground.

As a result, it is possible that the cracks are generated at the groove bottoms, which leads to decrease of durability.

SUMMARY OF THE INVENTION

The present invention was made in view of the above, and a primary object thereof is to provide a pneumatic radial tyre especially suitable for a motor cycle and capable of improving the durability by suppressing the generation of the cracks at the groove bottoms of the shoulder lateral grooves.

In one aspect of the present invention, a pneumatic radial tyre includes a tread portion including a tread surface extending in a convex arc shape between a tyre equator and a tread surface outer end, a shoulder main groove extending in a tyre circumferential direction, a shoulder land region defined between the shoulder main groove and the outer end of the tread surface, and a plurality of shoulder lateral grooves each crossing the shoulder land region, wherein in a cross sectional view of at least one of the shoulder lateral grooves taken along a groove width center line thereof, a groove bottom of the shoulder lateral groove includes a first bottom surface portion arranged on an inner side in a tyre axial direction and a second bottom surface portion extending between the first bottom surface portion and the tread surface outer end in a concave arc shape having a radius of curvature (R).

In another aspect of the invention, it is preferred that the radius of curvature (R) is 50 mm or more and 200 mm or less.

In another aspect of the invention, it is preferred that the second bottom surface portion is connected with the first bottom surface portion.

In another aspect of the invention, it is preferred that the at least one of the shoulder lateral grooves has a groove width increasing toward the tread surface outer end.

In another aspect of the invention, it is preferred that a maximum groove depth of the at least one of the shoulder lateral grooves is 4.0 mm or less.

In another aspect of the invention, it is preferred that an angle of the groove width center line of the at least one of the shoulder lateral grooves with respect to the tyre circumferential direction is 50 degrees or more and 90 degrees or less.

In another aspect of the invention, it is preferred that the pneumatic radial tyre further includes a carcass extending between the tread portion and a bead portion via a sidewall portion and a tread reinforcing cord layer arranged on an outer side in a tyre radial direction of the carcass and inside the tread portion, wherein an outer end in the tyre axial direction of the tread reinforcing cord layer is positioned on an outer side in the tyre axial direction of the shoulder main groove.

As described above, according to the present disclosure, the groove bottom of the at least one of the shoulder lateral grooves includes the first bottom surface portion arranged on the inner side in the tyre axial direction and the second bottom surface portion extending between the first bottom surface portion and the tread surface outer end in the concave arc shape having the radius of curvature (R).

That is, in the at least one of the shoulder lateral grooves, in the region of the second groove surface portion, the groove depth gradually and continuously decreases outwardly in the tyre axial direction and moreover, the groove depth becomes zero at the tread surface outer end.

Thereby, rigidity at the groove bottom is increased, therefore, the deformation at the groove bottom upon contacting the ground can be suppressed. As a result, generation of cracks at the groove bottom is suppressed, thereby, the durability can be improved.

Further, in the at least one of the shoulder lateral grooves, the rigidity increases toward the tread surface outer end, therefore, excellent steering stability can be exerted particularly in a tyre for a motorcycle which corners with the vehicle body banked.

DESCRIPTION OF THE PREFERRED EMBODIMENT

An embodiment of the present invention will now be described below in detail in conjunction with accompanying drawings.

Figure 1:
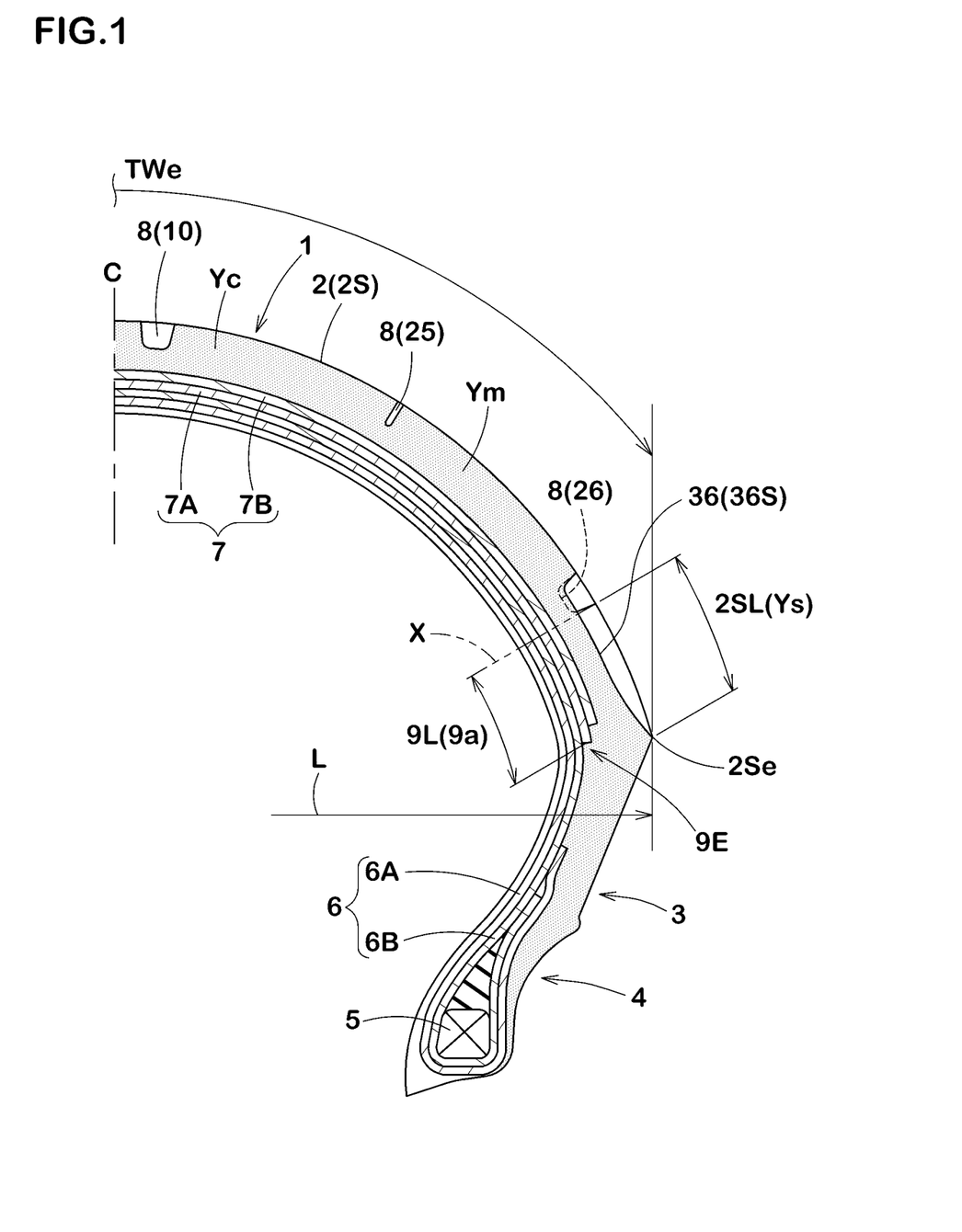
FIG. 1 is a tyre meridian section of a pneumatic radial tyre according to an embodiment of the present invention.

As shown in FIG. 1, in a pneumatic radial tyre 1 (hereinafter, may be simply referred to as "tyre 1"), a tread surface (2S) forming an outer surface of a tread portion 2 extends in a convex arc shape between a tyre equator (C) and a tread surface outer end (2Se). In this embodiment, a half of the tyre meridian section is shown in FIG. 1, as the other half has the same configuration. The tyre 1 in this embodiment is a tyre for a motorcycle and, in a standard inner pressure state, a linear distance (L) between the tread surface outer ends (2Se) is a tyre maximum width. Thereby, this enables cornering while the vehicle body is greatly tilted.

The "standard inner pressure state" is a state in which the tyre 1 is mounted on a standard rim (not shown), inflated to a standard inner pressure, and loaded with no tyre load. In this specification, dimensions and the like of various parts of the tyre 1 are those measured under the standard inner pressure state unless noted otherwise.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

Inside the tyre 1, the tyre 1 is provided with a carcass 6 extending between bead portions 4 via the tread portion 2 and sidewall portions 3 and a tread reinforcing cord layer 9 arranged inside the tread portion 2 and on an outer side in a tyre radial direction of the carcass 6.

The carcass 6 is formed of one or more carcass plies, two carcass plies 6A and 6B in this embodiment, each having carcass cords arranged at an angle of 65 degrees or more and 90 degrees or less with respect to the tyre equator (c). Each end of the carcass 6 is turned up around a respective one of bead cores 5 to be locked.

As the tread reinforcing cord layer 9, a belt layer 7 is employed in this embodiment. The belt layer 7 is formed of one or more belt plies, two belt plies 7A and 7B in this embodiment, each having belt cords (tread reinforcing cords) arranged at an angle of 10 degrees or more and 35 degrees or less with respect to the tyre equator (C), for example. The belt cords of the belt ply 7A are arranged so as to intersect with the belt cords of the belt ply 7B, therefore, belt rigidity is increased. A band layer (not shown) may be employed as the tread reinforcing cord layer 9 instead of the belt layer 7. This band layer is formed of a band ply having band cords wound spirally at an angle of 5 degrees or less with respect to the tyre equator (C). Note that the belt layer 7 and the band layer may be used in combination as the tread reinforcing cord layer 9.

As shown in FIGS. 1 and 2, the tread portion 2 is provided with circumferential grooves 8 each extending in a tyre circumferential direction. The circumferential grooves 8 include a shoulder main groove 26 arranged outermost in the tyre axial direction. In this embodiment, the case is shown in which the circumferential grooves 8 include a pair of the shoulder main grooves 26, a crown main groove 10 arranged innermost in the tyre axial direction, and middle main grooves 25 each arranged between the crown main groove 10 and a respective one of the shoulder main grooves 26.

As a result, the tread portion 2 is divided into shoulder land regions (Ys) each defined between a respective one of the shoulder main grooves 26 and its adjacent one of the tread surface outer ends (2Se), middle land regions (Ym) each defined between a respective one of the shoulder main grooves 26 and its adjacent one of the middle main grooves 25, and crown land regions (Yc) each defined between a respective one of the middle main grooves 25 and its adjacent one of the crown main groove 10. The crown land regions (Yc) are the main regions which come into contact with a road surface during straightaway driving. The shoulder land regions (Ys) are the main regions which come into contact with a road surface during cornering in full bank.

Figure 3:
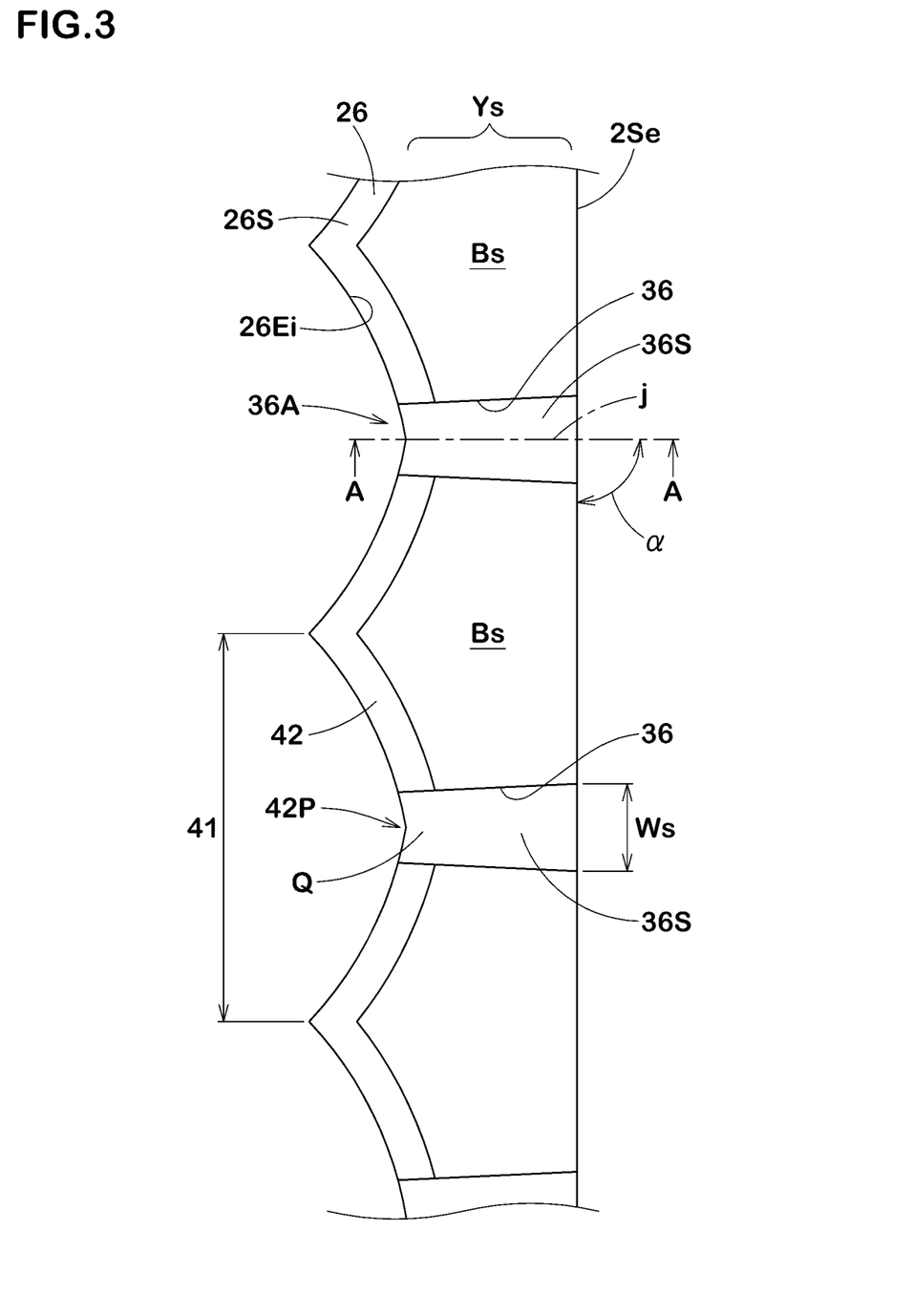
FIG. 3 is an enlarged development view of a shoulder land region.

As shown in FIG. 3, each of the shoulder land regions (Ys) is provided with a plurality of shoulder lateral grooves 36 each crossing a respective one of the shoulder land regions (Ys). Thereby, the shoulder land regions (Ys) is divided into a plurality of blocks (Bs).

Figure 4:
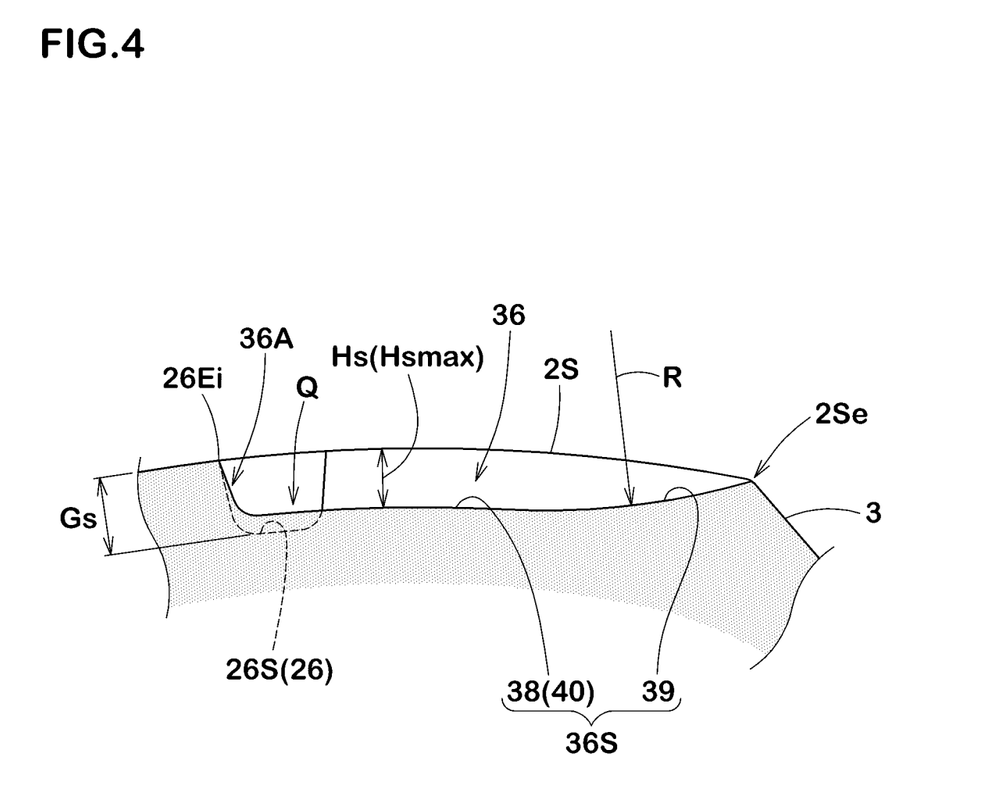
FIG. 4 is a cross-sectional view of one of shoulder lateral grooves passing through a groove width center line and taken along A-A line.

FIG. 4 is a cross-sectional view of at least one of, in this embodiment each of, the shoulder lateral grooves 36 taken along a groove width center line (j) thereof (cross-sectional view taken along a-a line in FIG. 3). As shown in the figure, each of the shoulder lateral grooves 36 is configured such that a groove bottom (36S) thereof includes a first bottom surface portion 38 arranged on an inner side in the tyre axial direction and a second bottom surface portion 39 extending in a concave arc shape having a radius of curvature (R) between the first bottom surface portion 38 and its adjacent one of the tread surface outer ends (2Se). It is preferred that the second bottom surface portion 39 is connected with the first bottom surface portion 38.

In the second bottom surface portion 39 configured in a concave arc shape, a groove depth (Hs) from the tread surface (2S) gradually and continuously decreases outwardly in the tyre axial direction, and moreover, the groove depth (Hs) becomes zero at the tread surface outer end (2se). Note that the expression "concave arc shape" means an arc having an arc center thereof positioned on an outer side of the tyre of the tread surface (2S).

On the other hand, the groove depth (Hs) of the first bottom surface portion 38 is equal to or larger than the groove depth (Hs) of the second bottom surface portion 39. The first bottom surface portion 38 includes a maximum groove depth portion 40 in which the groove depth (Hs) is a maximum groove depth (Hs max) in the shoulder lateral groove 36. In this embodiment, the groove depth (Hs) of the first bottom surface portion 38 is substantially constant, therefore, the entire first bottom surface portion 38 forms the maximum groove depth portion 40.

Note that, in the case in which the groove depth (Ms) of the first bottom surface portion 38 varies in a length direction thereof, it is preferred that the groove depth (Hs) gradually increases axially inwardly.

Figure 5A:
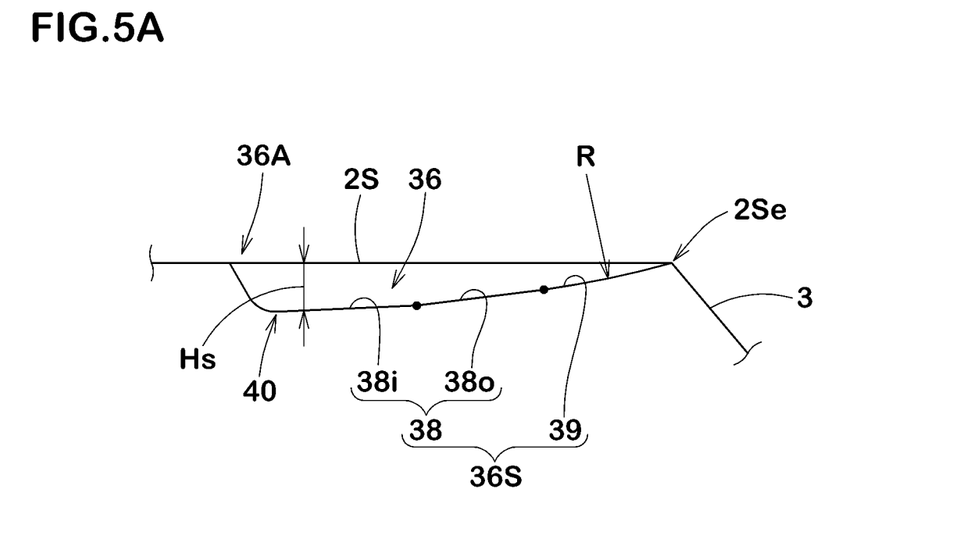
FIG. 5A is a cross-sectional view of one of the shoulder lateral grooves according to another embodiment.
Figure 5B:
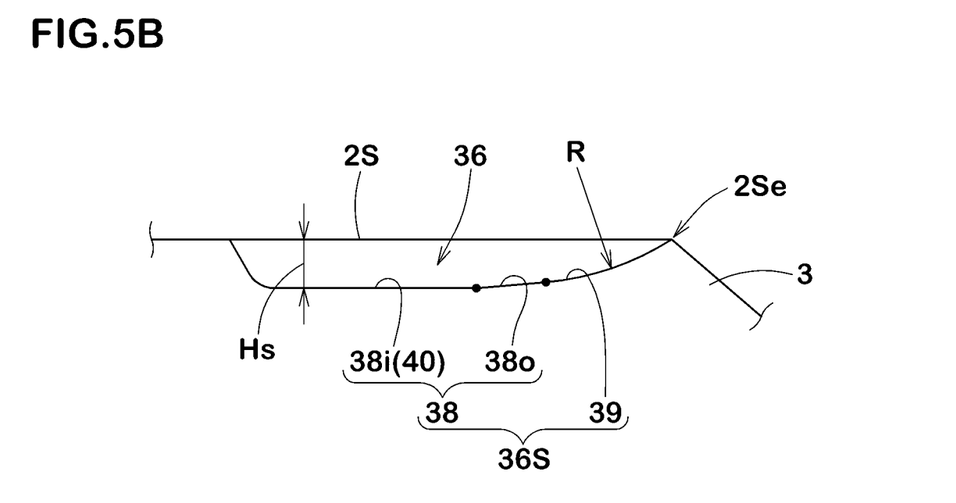
FIG. 5B is a cross-sectional view of one of the shoulder lateral grooves according to yet another embodiment.

FIGS. 5A and 5B show other embodiments of the groove bottom (36S) of each of the shoulder lateral grooves 36. In the figures, in order to clarify the shape of the groove bottom (36S), the tread surface (2S) is illustrated as a linear line. However, the tread surface (2S) is actually curved in a convex arc shape as in FIG. 4. In each of these embodiments, the first bottom surface portion 38 is formed by a first groove bottom portion (38i) (inner first groove bottom portion) arranged on the inner side in the tyre axial direction and a first groove bottom portion (38o) (outer first groove bottom portion) arranged on the outer side in the tyre axial direction. As shown in each of FIGS. 5A and 5B, the outer first groove bottom portion (38o) extends axially inwardly with the groove depth (Hs) increasing at a constant ratio. Further, in FIG. 5A, the inner first groove bottom portion (38i) extends axially inwardly with the groove depth (Hs) increasing at a constant ratio, but the increasing ratio is smaller than that of the outer first groove bottom portion (38o). Furthermore, in FIG. 5B, the inner first groove bottom portion (38i) extends axially inwardly with the constant groove depth (Hs).

As shown in FIGS. 3 and 4, an inner end (36A) in the tyre axial direction of at least one of, in this embodiment each of, the shoulder lateral grooves 36 is positioned at an intersection thereof with an inner edge (26Ei) in the tyre axial direction of a respective one of the shoulder main grooves 26. Further, the maximum groove depth (Hs max) of each of the shoulder lateral grooves 36 is smaller than a groove depth (Gs) of each of the shoulder main grooves 26. Therefore, a groove bottom (26S) of each of the shoulder main grooves 26 overlaps with the groove bottoms (36S) of the shoulder lateral grooves 36, and at each of overlapping portions (Q), the shallower groove bottom (36S) is shown.

As described above, in the tyre 1, the groove bottom (36S) of each of the shoulder lateral grooves 36 includes the second bottom surface portion 39 extending in a concave arc shape at the radius of curvature (R) between the first bottom surface portion 38 arranged on the inner side in the tyre axial direction and the tread surface outer end (2Se). That is, in the region in which the second bottom surface portion 39 is arranged, the groove depth (Hs) of each of the shoulder lateral grooves 36 gradually decreases axially outwardly and, moreover, the groove depth (Hs) becomes zero at the tread surface outer end (2Se).

Thereby, rigidity at the groove bottom (36S) is increased, therefore, deformation at the groove bottom (36S) upon contacting the ground is suppressed. As a result, generation of cracks at the groove bottom (36S) is suppressed.

At this time, it is preferred that the radius of curvature (R) is 50 mm or more and 200 mm or less. If the radius of curvature (R) is less than 50 mm, it becomes difficult to maintain the rigidity of the shoulder land regions (Ys) high, therefore, steering stability during cornering tends to decrease. Further, if the radius of curvature (R) is more than 200 mm, a groove volume of each of the shoulder lateral grooves 36 is decreased, therefore, the drainage property is deteriorated, thereby, the wet performance is negatively affected. Therefore, it is preferred that the lower limit of the radius of curvature (R) is 70 mm or more and the upper limit is 150 mm or less.

As shown in FIG. 3, it is preferred that a groove width (Ws) of each of the shoulder lateral grooves 36 increases as it goes toward the tread surface outer end (2Se). Thereby, it is possible that the decrease of the groove volume due to the second bottom surface portion 39 is suppressed, therefore, it is possible that the deterioration of the drainage property and the wet performance are minimized.

In the case of a tyre for a motorcycle, it is preferred that the maximum groove depth (Hs max) of each of the shoulder lateral grooves 36 is 4.0 mm or less, and if it is more than 4.0 mm, it becomes difficult to maintain the steering stability during cornering even if the second bottom surface portion 39 configured in a concave arc shape is provided. It is more preferred that the upper limit of the maximum groove depth (Hs max) is 3.0 mm or less and the lower limit is 2.0 mm or more from a point of view of the drainage property.

It is preferred that an angle α of the groove width center line (j) of each of the shoulder lateral grooves 36 with respect to the tyre circumferential direction is 50 degrees or more and 90 degrees or less. Here, the smaller the angle α is, the less likely it is to be affected by the radial arrangement, therefore, cracks are less likely to be generated. But on the other hand, the drainage property, soil discharging property, and the steering stability are negatively affected. Therefore, from the point of view of the balance between the suppression of generation of cracks, the drainage property, the soil discharging property, and the steering stability, it is preferred that the angle α is 50 degrees or more and 90 degrees or less.

As shown in FIG. 1, it is preferred that each of outer ends (9E) in the tyre axial direction of the tread reinforcing cord layer 9 terminates on the outer side in the tyre axial direction of a respective one of the shoulder main grooves 26. Specifically, it is preferred that each of the outer ends (9E) is positioned on the outer side in the tyre axial direction of a reference line (X) orthogonal to the tread surface (2S) and passing through an outer edge in the tyre axial direction of a respective one of the shoulder main grooves 26.

In the tread reinforcing cord layer 9 configured as such, an extending-out portion (9a) which extends outwardly in the tyre axial direction beyond the reference line (X) reinforces a portion below a respective one of the shoulder lateral grooves 36, therefore, the deformation upon contacting the ground at the groove bottom (36S) is suppressed. Thereby, in cooperation with the second bottom surface portion 39 configured in the concave arc shape, it is possible that the effect of suppressing the generation of the cracks is further improved. Furthermore, it is also helpful for improving uneven wear resistance performance and the steering stability.

A length (9L) of the extending-out portion (9a) in the tyre axial direction along the tread reinforcing cord layer 9 is preferably 30% or more and more preferably 50% or more of a length (2SL) along the treed surface (2S) of each of the shoulder land regions (Ys).

As shown in FIG. 3, each of the shoulder main grooves 26 in this embodiment is formed by a plurality of unit patterns 41 arranged repeatedly in the tyre circumferential direction. Note that each of the shoulder main grooves 26 may be configured as a straight groove extending linearly in the tyre circumferential direction instead of having the repeated unit patterns 41.

Each of the unit patterns 41 in this embodiment is formed by an arc portion 42 curved in an arc shape convex outwardly in the tyre axial direction. The shoulder main grooves 26 configured as such do not include a component extending in parallel with the tyre circumferential direction (hereinafter, may be referred to as a "circumferential component"). Thereby, the deformation of the shoulder main grooves 26 at the groove bottoms (26S) is suppressed, the generation of the cracks at the groove bottoms (26S) is suppressed, and therefore, the steering stability is improved. Further, vibration of the air passing through the shoulder main grooves 26 is suppressed, therefore, it is helpful for improving the noise performance.

In this embodiment, each of the arc portions 42 is connected at a top portion (42P) thereof which extrudes outermost in the tyre axial direction with a respective one of the shoulder lateral grooves 36. Thereby, a length in the tyre axial direction of each of the shoulder lateral grooves 36 can be short. As a result, it is advantageous for suppressing the cracks in the groove bottoms (36S), improving the steering stability, and so on.

Figure 6:
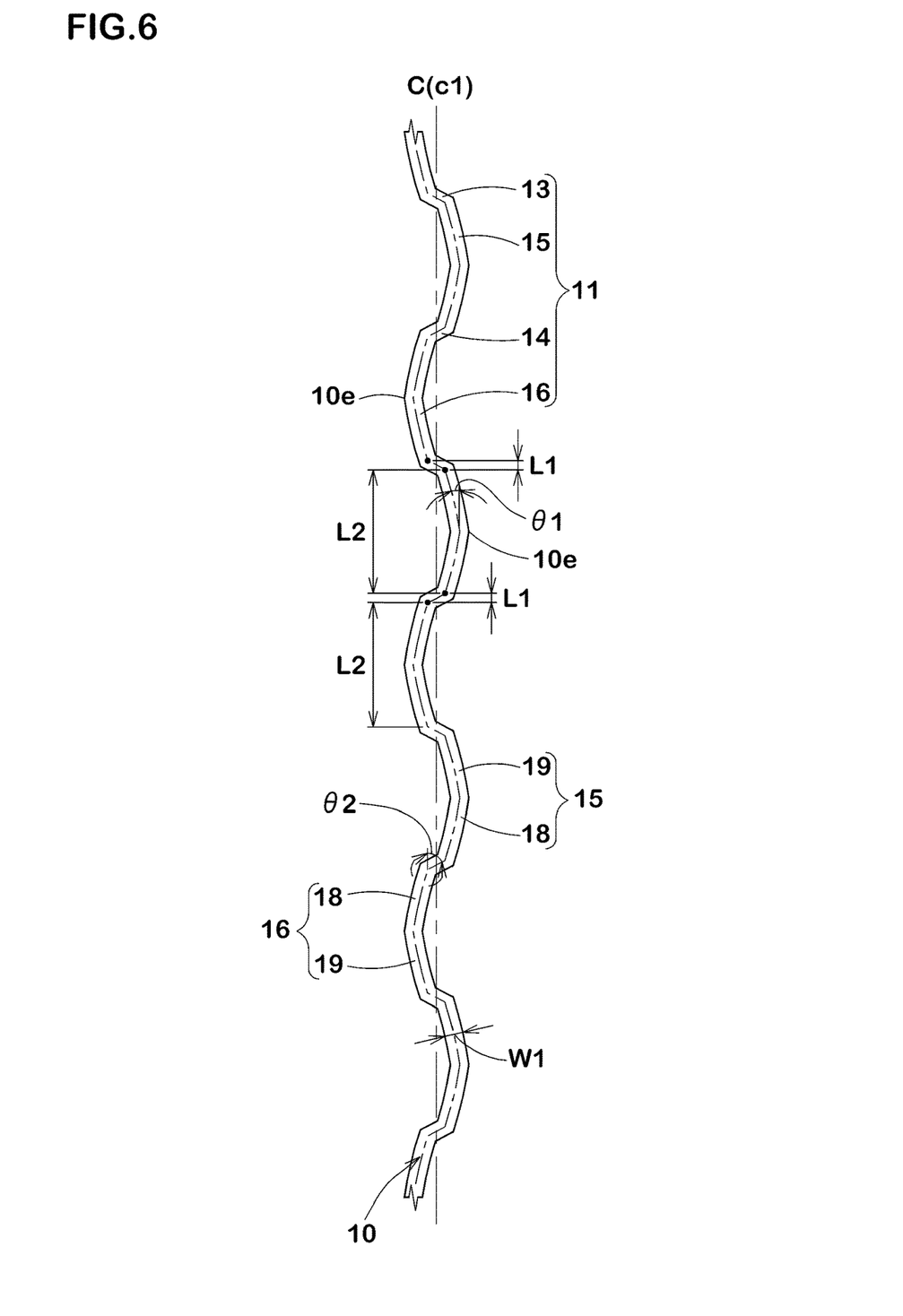
FIG. 6 is an enlarged view of a crown main groove.

As shown in FIG. 6, the crown main groove 10 in this embodiment is formed by a plurality of unit patterns 11 arranged repeatedly in the tyre circumferential direction. Note that the crown main groove 10 may be configured as a straight groove extending linearly in the tyre circumferential direction instead of having the repeated unit patterns 11.

Each of the unit patterns 11 in this embodiment is formed by a first inclined element 13, a second inclined element 14, a first bent element 15, and a second bent element 16. The first inclined element 13 extends so as to cross a first tyre circumferential direction line (c1) obliquely (upward to the left in the figure). The second inclined element 14 extends so as to cross the first tyre circumferential direction line (c1) obliquely in an opposite direction to the first inclined element 13 (upward to the right in the figure). The first bent element 15 extends so as to connect between the first inclined element 13 and the second inclined element 14. The second bent element 16 is connected with the second inclined element 14. That is, each of the unit patterns 11 in this embodiment is formed by the first inclined element 13, the first bent element 15, the second inclined element 14, and the second bent element 16 arranged in this order from the upper side in the figure.

The first bent element 15 is bent so as to be convex toward one side (right side in the figure) in the tyre axial direction without having the circumferential component. Further, the second bent element 16 is bent so as to be convex toward the other side (left side in the figure) in the tyre axial direction without having the circumferential component. The crown main groove 10 configured as such does not have the circumferential component, therefore, it is prevented from getting engaged with a rain groove provided in a rain groove road, for example. As a result, it is possible that the lane change is performed smoothly. Further, for example, in the tyre 1 in which the band cords extend in the tyre circumferential direction, the crown main groove 10 and the band cords extend in different directions, therefore, the deformation at the groove bottom is suppressed, thereby, the generation of the cracks at the groove bottom is suppressed. Furthermore, the vibration of the air passing through the crown main groove 10 is disturbed, therefore, it is helpful for improving the noise performance.

Each of the first inclined element 13 and the second inclined element 14 has a larger angle with respect to the tyre circumferential direction and a smaller length in the tyre circumferential direction than each of the first bent element 15 and the second bent element 16. That is, the first inclined element 13 and the second inclined element 14 which have larger angles with respect to the tyre circumferential direction are each configured to have a smaller length in the tyre circumferential direction than the first bent element 15 and the second bent element 16. The first inclined element 13 and the second inclined element 14 configured as such enable smooth lane change while the deformation at the groove bottom is suppressed, therefore, the generation of the cracks at the groove bottom is suppressed. Further, the first inclined element 13 and the second inclined element 14 having smaller length components in the tyre axial direction suppress generation of pitch sound. The first bent element 15 and the second bent element 16 have large lengths in the tyre circumferential direction but small angles with respect to the tyre circumferential direction, therefore, generation of large pitch noise is suppressed.

Each of the first bent element 15 and the second bent element 16 includes a first portion 18 inclined to one side (upward to the right in the figure) with respect to the tyre circumferential direction and a second portion 19 connected with the first portion 18 and inclined to the opposite side (upward in the left in the figure) to the first portion 18.

The first portion 18 and the second portion 19 extend linearly. Thereby, the first bent element 15 is formed to be transversely V-shaped convex toward one side in the tyre axial direction. Further, the second bent element 16 is formed to be transversely V shaped convex toward the other side in the tyre axial direction. Each of the first bent element 15 and the second bent element 16 configured as such disturbs the vibration of the air flowing through the groove at the connection portion between the first portion 18 and the second portion 19, therefore, it is possible that the noise performance is maintained high.

It is preferred that an angle $\theta 1$ with respect to the tyre circumferential direction of each of the first portion 18 and the second portion 19 is 5 degrees or more and 20 degrees or less, for example. If the angle $\theta 1$ is less than 5 degrees, it is possible that the effect of suppressing the generation of the cracks is deteriorated. If the angle $\theta 1$ is more than 20 degrees, it is possible that the pitch sound due to rolling of the tyre 1 is increased.

Each of the first bent elements 15 and the second bent elements 16 is formed so as not to cross the first tyre circumferential direction line (c1), therefore, the crown main groove 10 in this embodiment is formed so as to be point symmetric with respect to each of intersecting points of the first tyre circumferential direction line (c1) and a groove center line of the crown main groove 10. Note that the crown main groove 10 is not limited to such an embodiment, and it may be configured to be point-asymmetric.

It is preferred that a length (L1) in the tyre circumferential direction of each of the first inclined elements 13 and the second inclined elements 14 is 5% or more and 15% or less of a length (L2) in the tyre circumferential direction of each of the first bent elements 15 and the second bent elements 16. Thereby, it is possible that the steering stability performance is improved and that the generation of the cracks is suppressed while the noise performance is maintained in a good balance.

Each of the first inclined elements 13 and the second inclined elements 14 extends linearly. Note that the first inclined elements 13 and the second inclined elements 14 are not limited to such an embodiment, and they may each be configured to extend in an arc shape.

Although not particularly limited, it is preferred that an angle $\theta 2$ of each of the first inclined elements 13 and the second inclined elements 14 is about 45 degrees or more and about 75 degrees or less, for example. Thereby, it is possible that the vibration of the air in the crown main groove 10 is disturbed at the connection points of the first bent elements 15 and the first inclined elements 13 and the connection points of the second bent elements 16 and the second inclined elements 14. Further, it is possible that the increase of the pitch sound generated by the first inclined elements 13 and the second inclined elements 14 is suppressed.

It is preferred that the first tyre circumferential direction line (c1) is positioned on the tyre equator (C).

It is preferred that each of ends (10e) in the tyre axial direction of the crown main groove 10 is arranged at a position within a range 4% or more and 10% or less of a tread development width (TWe) (shown in FIGS. 1 and 2) axially outward from the tyre equator (c). Each of the ends (10e) of the crown main groove 10 is formed at a connection position between the first portion 18 and the second portion 19 of a respective one of the first bent elements 15 and the second bent elements 16.

The crown main groove 10 is configured to have a constant groove width (W1) which does not vary in tyre circumferential direction. Note that the crown main groove 10 is not limited to such an embodiment and the groove width (W1) may vary. In this specification, the term "groove width" means a length of a groove in a direction perpendicular to the groove center line thereof extending in a length direction thereof.

Figure 7:
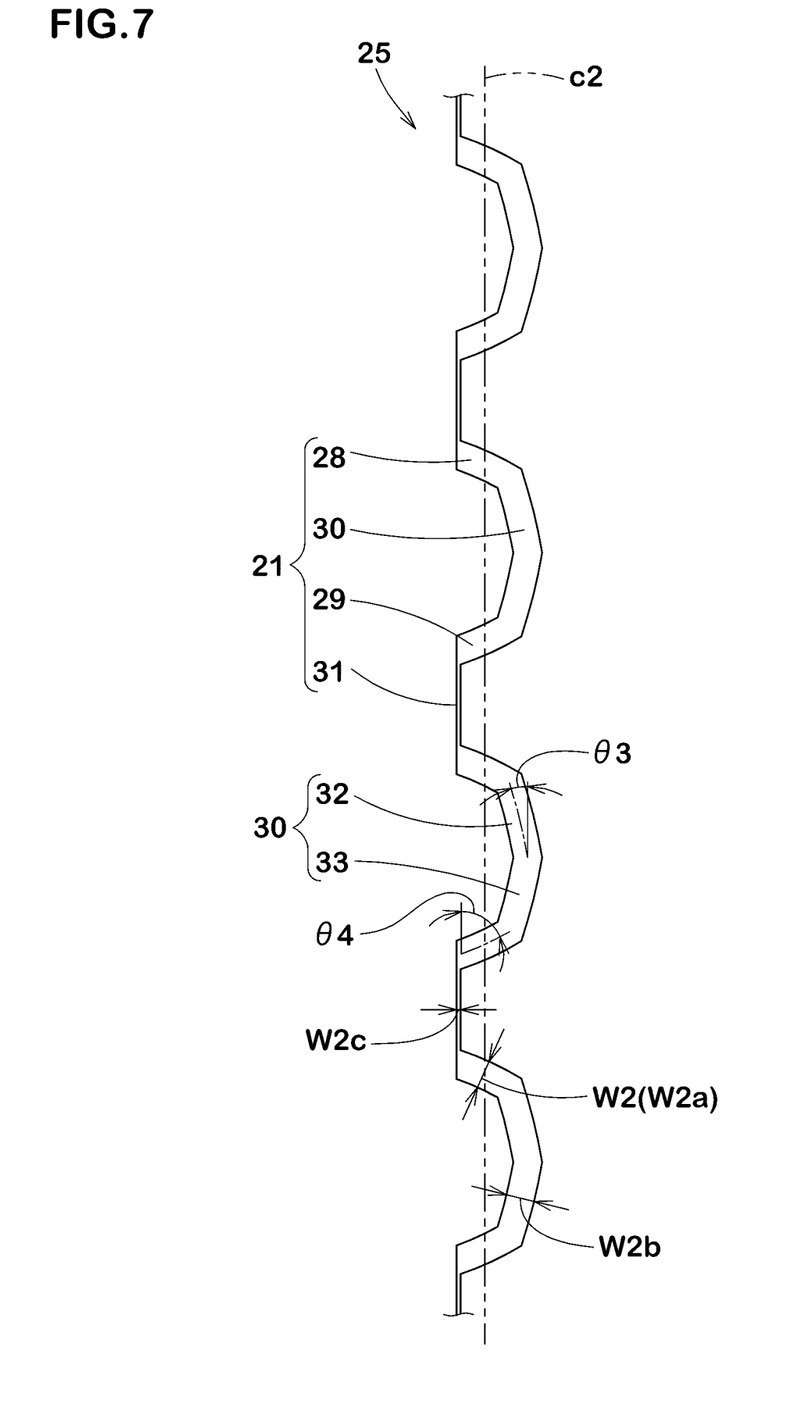
FIG. 7 is an enlarged view of one of middle main grooves.

As shown in FIG. 7, the middle main grooves 25 in this embodiment is formed of a plurality of unit patterns 21 arranged repeatedly in the tyre circumferential direction. Note that each of the middle main grooves 25 may be configured as a straight groove extending linearly in the tyre circumferential direction instead of having the repeated unit patterns 21.

Each of the unit patterns 21 in this embodiment is formed by a middle first inclined element 28, a middle second inclined element 29, a middle bent element 30, and a linear element 31. The middle first inclined element 28 extends so as to cross a second tyre circumferential direction line (c2) obliquely (upward to the left in the figure). The middle second inclined element 29 extends so as to cross the second tyre circumferential direction wire (c2) obliquely in an opposite direction to the middle first inclined element 28 (upward to the right in the figure). The middle bent element 30 extends so as to connect between the middle first inclined element 28 and the middle second inclined element 29. The linear element 31 is connected with the middle second inclined element 29. As just described above, each of the unit patterns 21 in this embodiment is formed by the middle first inclined element 28, the middle bent element 30, the middle second inclined element 29, and the linear element 31 arranged in this order from the upper side in the figure.

The middle bent element 30 includes a middle first portion 32 inclined to one side with respect to the tyre circumferential direction and a middle second portion 33 connected with the middle first portion 32 and inclined to an opposite direction to the middle first portion 32.

The middle first portion 32 and the middle second portion 33 extend linearly. That is, the middle bent element 30 is formed to be transversely v-shaped convex in the tyre axial direction toward the tyre equator (C). It is possible that each of the middle bent elements 30 configured as such disturbs the vibration of the air flowing in a respective one of the middle main grooves 25 at the connection portion between the middle first portion 32 and the middle second portion 33. Note that each of the middle first portions 32 and the middle second portions 33 may be configured to extend in an arc shape.

It is preferred that an angle θ3 with respect to the tyre circumferential direction of each of the middle first portions 32 and the middle second portions 33 is 5 degrees or more and 20 degrees or less, for example. Thereby, the pitch sound due to rolling of the tyre 1 can be decreased and the generation of cracks at the groove bottoms can be suppressed.

Each of the linear elements 31 extends in the tyre circumferential direction. Each of the linear elements 31 configured as such disturbs the vibration of the air in a respective one of the middle main grooves 25 at the connection portion with a respective one of the middle second inclined elements 29. Further, the linear elements 31 are the main portions which come into contact with the ground during transition from straightaway driving to cornering, therefore, even when running on a rain groove road, for example, it is less likely to get engaged with the rain grooves, thereby, the stability during lane change is maintained high.

It is preferred that a groove width (W2c) of each of the linear elements 31 is 5% or more and 30% or less of a groove width (W2b) of each of the middle bent elements 30. Further, it is preferred that a groove depth (not shown) of each of the linear elements 31 is 50% or more and 90% or less of a groove depth (not shown) of each of the middle bent elements 30.

A groove width (W2a) of each of the middle first inclined elements 28 and the middle second inclined elements 29 and the groove width (W2b) of each of the middle bent elements 30 are each larger than the groove width (W1) of the crown main groove 10. That is, by decreasing the groove width (W1) of the crown main groove 10, the running stability during straight running can be improved.

As shown in FIG. 2, in this embodiment, the pitch number of the unit patterns 11, the pitch number of the unit patterns 21, and the pitch number of the unit patterns 41 are equal to each other. Further, each of the middle bent elements 30 of one of the middle main grooves 25 on the left side is formed at the same position in the tyre circumferential direction as a respective one of the first bent elements 15. Furthermore, each of the middle bent elements 30 of one of the middle main grooves 25 on the right side is formed at the same position in the tyre circumferential direction as a respective one of the second bent elements 16. Thereby, variation in the tyre circumferential direction of a width in the tyre axial direction of each of the crown land regions (Yc) is suppressed to be low. Furthermore, each of the linear elements 31 of each of the middle main grooves 25 and a respective one of the top portions (42P) of one of the shoulder main grooves 26 respectively adjacent thereto are formed at the same position in the tyre circumferential direction. Thereby, the variation in the tyre circumferential direction of a width in the tyre axial direction of each of the middle land regions (Ym) is suppressed to be low. As a result, it is possible that the stability is maintained high during transition from straightaway driving to cornering. Furthermore, it is possible that excellent uneven wear resistance performance is exerted.

The present invention is not limited to a tyre for a motorcycle, and can be applied to a tyre for a passenger car, a tyre for heavy loads, and tyres of other categories, for example.

While detailed description has been made of the tyre as especially preferred embodiment of the present invention, the present invention can be embodied in various forms without being limited to the illustrated embodiment.

WORKING EXAMPLES (EXAMPLES)

Pneumatic radial tyres (of size 180/55R17) for a motorcycle having the basic structure shown in FIG. 1 and the basic pattern shown in FIG. 2 were made by way of test according to the specifications listed in Table 1. And then each of the test tyres was tested for resistance to cracks at the groove bottoms of the shoulder lateral grooves, the steering stability, and the wet performance.

Each of the test tyres had the same specifications except for those shown in Table 1. The test methods were as follows.

<Resistance to Cracks>

Each of the test tyres was mounted on a rim (MT5.50×17), inflated to an inner pressure of 290 kPa, and mounted on a rear wheel of a large-sized motorcycle (of displacement 1300 cc), and then the motorcycle was driven on a dry asphalt road surface of a test course for a distance of 5000 km. After the test run, the occurrence of cracks at the groove bottoms of the shoulder lateral grooves was observed by visual inspection by an inspector. The evaluation was made according to the following three grades.

A—No cracks are observed.
B—No clear cracks but signs of cracks are observed.
C—Cracks are observed.

<Steering Stability>

By using the test vehicle described above, while a test driver was driving the test vehicle on the test course described above, the steering stability during cornering and during lane change was evaluated by the driver's feeling. The evaluation was indicated by a 5-point method based on Reference 1 being 3, wherein the larger the numerical value, the better the steering stability is.

<Wet Performance>

By using the test vehicle described above, while the test driver was driving the test vehicle on a wet asphalt road surface of the test course described above, the steering stability during cornering and during lane change was evaluated by the driver's feeling. The evaluation was indicated by the 5-point method based on the Reference 1 being 3, wherein the larger the numerical value, the better the wet performance is.

TABLE 1

|  | Ref.1 | Ref.2 | EX.1 | Ex.2 | Ex.3 | Ex.4 | Ex.5 | Ex.6 | Ex.7 |
|---|---|---|---|---|---|---|---|---|---|
| <Shoulder lateral groove> | Absence |  |  |  | Presence |  |  |  |  |
| Groove depth at Outer end of Tread surface | — | 3 |  |  |  |  | 0 |  |  |
| Presence or Absence of concave arc shaped Second bottom surface portion | — |  |  |  | Presence |  |  |  |  |
| Radius of curvature (R) [mm] | — | 100 | 100 | 40 | 50 | 200 | 230 | 100 | 100 |
| Groove width toward Outer end of Tread surface | — |  |  | increasing |  |  |  | decreasing | constant |
| Maximum groove depth (Hs max) [mm] | — |  |  |  | 3 |  |  |  |  |
| Angle α of Groove width center line [degree] | — |  |  |  | 90 |  |  |  |  |
| <Tread reinforcing cord layer> Presence or Absence of Extending-out Portion *1 |  |  |  |  | Band layer Presence |  |  |  |  |
| Resistance to cracks | A | C | A | A | A | A | A | A | A |
| Steering stability | 3 | 2 | 3 | 2.5 | 3 | 3 | 3 | 3 | 3 |
| Wet performance | 3 | 4 | 4.5 | 4.5 | 4.5 | 4 | 3.5 | 3.5 | 4 |

|  | Ex.8 | Ex.9 | Ex.10 | Ex.11 | Ex.12 |
|---|---|---|---|---|---|
| <Shoulder lateral groove> |  |  | Presence |  |  |
| Groove depth at Outer end of Tread surface |  |  | 0 |  |  |
| Presence or Absence of concave arc shaped Second bottom surface portion |  |  | Presence |  |  |
| Radius of curvature (R) [mm] |  |  | 100 |  |  |
| Groove width toward Outer end of Tread surface |  |  | increasing |  |  |
| Maximum groove depth (Hs max) [mm] | 5 | 4 | 2 |  | 3 |
| Angle α of Groove width center line [degree] |  | 90 |  | 50 | 30 |
| <Tread reinforcing cord layer> Presence or Absence of Extending-out Portion *1 |  |  | Band layer Presence |  |  |
| Resistance to cracks | A | A | A | A | A |
| Steering stability | 2 | 3 | 3 | 3 | 2 |
| Wet performance | 5 | 4.5 | 3.5 | 4 | 4 |

*1) Length (9L) of Extending-out portion (9a) is 70% of Length (2SL) of shoulder land region (Ys).

From the test results, it was confirmed that the resistance to cracks at the groove bottoms of the shoulder lateral grooves was improved in the tyres as Examples.

The invention claimed is:

1. A pneumatic radial tyre comprising a tread portion comprising a tread surface extending in a convex arc shape between a tyre equator and a tread surface outer end, a shoulder main groove extending in a tyre circumferential direction, a shoulder land region defined between the shoulder main groove and the outer end of the tread surface, and a plurality of shoulder lateral grooves each crossing the shoulder land region, wherein
   in a cross sectional view of at least one of the shoulder lateral grooves taken along a groove width center line thereof, a groove bottom of the shoulder lateral groove includes a first bottom surface portion arranged on an inner side in a tyre axial direction and a second bottom surface portion extending between the first bottom surface portion and the tread surface outer end in a concave arc shape having a radius of curvature (R).

2. The pneumatic radial tyre according to claim 1, wherein the radius of curvature (R) is 50 mm or more and 200 mm or less.

3. The pneumatic radial tyre according to claim 1, wherein the second bottom surface portion is connected with the first bottom surface portion.

4. The pneumatic radial tyre according to claim 1, wherein the at least one of the shoulder lateral grooves has a groove width increasing toward the tread surface outer end.

5. The pneumatic radial tyre according to claim 1, wherein a maximum groove depth of the at least one of the shoulder lateral grooves is 4.0 mm or less.

6. The pneumatic radial tyre according to claim 1, wherein an angle of the groove width center line of the at least one of the shoulder lateral grooves with respect to the tyre circumferential direction is 50 degrees or more and 90 degrees or less.

7. The pneumatic radial tyre according to claim 1 further comprising a carcass extending between the tread portion and a bead portion via a sidewall portion and a tread reinforcing cord layer arranged on an outer side in a tyre radial direction of the carcass and inside the tread portion, wherein
   an outer end in the tyre axial direction of the tread reinforcing cord layer is positioned on an outer side in the tyre axial direction of the shoulder main groove.

8. The pneumatic radial tyre according to claim 1, wherein the second bottom surface portion has a groove depth from the tread surface gradually and continuously decreasing outwardly in the tyre axial direction so as to become zero at the tread surface outer end.

9. The pneumatic radial tyre according to claim 1, wherein
a groove depth of the first bottom surface portion is equal to or larger than a groove depth of the second bottom surface portion, and
the first bottom surface portion includes a maximum groove depth portion in which the groove depth of the shoulder lateral groove is maximum.

10. The pneumatic radial tyre according to claim 1, wherein
a groove depth of the first bottom surface portion gradually increases axially inwardly.

11. The pneumatic radial tyre according to claim 1, wherein
the first bottom surface portion is formed by an inner first groove bottom portion arranged on the inner side in the tyre axial direction and an outer first groove bottom portion arranged on an outer side in the tyre axial direction, and
the outer first groove bottom portion extends axially inwardly with a groove depth increasing at a constant ratio.

12. The pneumatic radial tyre according to claim 11, wherein
the inner first groove bottom portion extends axially inwardly with a groove depth increasing at a constant ratio which is smaller than that of the outer first groove bottom portion.

13. The pneumatic radial tyre according to claim 11, wherein
the inner first groove bottom portion extends axially inwardly with a constant groove depth.

14. The pneumatic radial tyre according to claim 1, wherein
an inner end in the tyre axial direction of the at least one of the shoulder lateral grooves is positioned at an intersection thereof with an inner edge in the tyre axial direction of the shoulder main groove.

15. The pneumatic radial tyre according to claim 1, wherein
a maximum groove depth of the at least one of the shoulder lateral grooves is smaller than a groove depth of the shoulder main groove.

16. The pneumatic radial tyre according to claim 1, wherein
the radius of curvature (R) is 70 mm or more and 150 mm or less.

17. The pneumatic radial tyre according to claim 1, wherein
a maximum groove depth of the at least one of the shoulder lateral grooves is 2.0 mm or more and 3.0 mm or less.

18. The pneumatic radial tyre according to claim 7, wherein
a length, in the tyre axial direction along the tread reinforcing cord layer, of an extending out portion of the tread reinforcing cord layer positioned on an outer side in the tyre axial direction of the shoulder main groove is 30% or more of a length along the tread surface of the shoulder land region.

19. The pneumatic radial tyre according to claim 1, wherein
the shoulder main groove is formed by a plurality of unit patterns arranged repeatedly in the tyre circumferential direction, and
each of the unit patterns is formed by an arc portion curved in an arc shape convex outwardly in the tyre axial direction.

20. The pneumatic radial tyre according to claim 19, wherein
each of the arc portions is connected at a top portion thereof which extrudes outermost in the tyre axial direction with a respective one of the shoulder lateral grooves.

* * * * *